(12) United States Patent
Chang et al.

(10) Patent No.: US 10,803,713 B1
(45) Date of Patent: Oct. 13, 2020

(54) LUMINOUS SOLID-STATE DISK

(71) Applicant: TEAM GROUP INC., New Taipei (TW)

(72) Inventors: Chin-Feng Chang, New Taipei (TW); Tzu-Hsien Chuang, New Taipei (TW); Hung-Lieh Lin, New Taipei (TW)

(73) Assignee: TEAM GROUP INC., New Taipei (TW)

( * ) Notice: Subject to any disclaimer, the term of this patent is extended or adjusted under 35 U.S.C. 154(b) by 0 days.

(21) Appl. No.: 16/576,457

(22) Filed: Sep. 19, 2019

(30) Foreign Application Priority Data

May 22, 2019 (TW) .............................. 108117699 A

(51) Int. Cl.
*G08B 5/36* (2006.01)
*F21V 8/00* (2006.01)
*H05B 47/175* (2020.01)

(52) U.S. Cl.
CPC .............. *G08B 5/36* (2013.01); *G02B 6/0021* (2013.01); *G02B 6/0031* (2013.01); *G02B 6/0073* (2013.01); *H05B 47/175* (2020.01)

(58) Field of Classification Search
CPC ............... G06F 13/385; G06F 13/4282; G06F 2212/214; H04L 49/356; H04L 49/9068
See application file for complete search history.

(56) References Cited

U.S. PATENT DOCUMENTS

| | | | |
|---|---|---|---|
| 10,346,335 B1* | 7/2019 | Vu | G06F 13/385 |
| 2003/0161199 A1* | 8/2003 | Estakhri | G11C 16/349 |
| | | | 365/200 |
| 2020/0142611 A1* | 5/2020 | Jeong | G06F 11/1456 |

* cited by examiner

*Primary Examiner* — Omeed Alizada
(74) *Attorney, Agent, or Firm* — Maschoff Brennan

(57) ABSTRACT

A luminous solid-state disk, comprises: a solid-state disk; a light-emitting member; a light-emitting controller; a disk enclosure accommodating the solid-state disk, the light-emitting member and the light-emitting controller, the disk enclosure having a connection interface, the light-emitting controller in connection to the connection interface to receive, through the connection interface, a computer terminal information from a computer, the light-emitting controller uses, according to the computer terminal information, a control signal to control the light-emitting member, the disk enclosure having a main wall surface, which is transparent, wherein light from the light-emitting member directly transmits through the main wall surface or is reflected to transmit through the main wall surface. Through the above structure, the main wall surface can be used as an information display to inform the user of the computer information.

15 Claims, 4 Drawing Sheets

LUMINOUS SOLID-STATE DISK

TECHNICAL FIELD

The present invention relates to a solid-state disk, and particularly to a luminous solid-state disk.

BACKGROUND OF THE INVENTION

A solid-state disk is a storage device using a flash memory as a storage element. Compared with traditional hard disks, solid-state disks are gradually replacing traditional hard disks in various circumstances due to their advantages of fast read/write speed, resistance to physical impact, low power consumption, and small size. The color light-emitting function of the conventional solid-state disk is focused on aesthetics for entertaining purpose and for forming a unique appearance in order to be different from others. However, there is still room for improvement in the practicality of the illuminating function of the solid-state disk.

SUMMARY OF THE INVENTION

Accordingly, it is an object of the present invention to provide a luminous solid-state disk that can be used as an information displaying device to notify information to users.

The invention adopts the technical means for solving the problems of the prior art to provide a luminous solid-state disk, comprising: a solid-state disk; a light-emitting member; a light-emitting controller in signal connection to the light-emitting member; a disk enclosure accommodating the solid-state disk, the light-emitting member and the light-emitting controller, the disk enclosure having a connection interface, the light-emitting controller in signal connection to the connection interface to receive, through the connection interface, a computer terminal information from a computer, the light-emitting controller uses, according to the computer terminal information, a control signal to control the light-emitting member, the disk enclosure having a main wall surface, which is transparent, wherein light from the light-emitting member directly transmits through the main wall surface or is reflected to transmit through the main wall surface, when light from the light-emitting member directly transmits through the main wall surface, the light-emitting member includes a light board and an LED array that disposes on the light board, wherein light from the LED array transmits towards the main wall surface such that the LED array displays, according to the control signal, a light pattern corresponding to the computer terminal information or a light color corresponding to the computer terminal information, when light from the light-emitting member reflects to transmit through the main wall surface, the light-emitting member includes a light guide plate and an LED light bar that bar disposed on a side edge of the light guide plate, light from the LED light bar transmits towards the light guiding surface, a luminous surface of the light guide plate disposed towards the main wall surface such that the LED light bar displays, according to the control signal, a light color corresponding to the computer terminal information.

In one embodiment of the invention, a luminous solid-state disk is provided, wherein the connection interface is a wired connection port.

In one embodiment of the invention, a luminous solid-state disk is provided, wherein the connection interface is a wireless communication chip.

In one embodiment of the invention, a luminous solid-state disk is provided, wherein the light-emitting controller receives, through the connection interface, a light synchronization signal from a motherboard of the computer such that the light-emitting controller controls the control signal to control the light-emitting member according to the light synchronization signal.

In one embodiment of the invention, a luminous solid-state disk is provided, wherein when the light-emitting controller does not receive the computer terminal information and the light synchronization signal, the light-emitting controller applies one of a plurality of lighting effects built in the light-emitting controller to use the control signal to control the light-emitting member.

In one embodiment of the invention, a luminous solid-state disk is provided, wherein the computer terminal information is system information of the computer.

In one embodiment of the invention, a luminous solid-state disk is provided, wherein the computer terminal information is health information of the solid-state disk extracted by the computer.

Through the technical means adopted by the illuminating solid-state hard disk of the present invention, the main wall surface can be used as an information displaying indicator to inform the user of the computer terminal information. In detail, the light-emitting component displays a pattern or color corresponding to the information of the computer on the main wall surface according to the computer terminal information, so that the user can know the information of the computer through the appearance of the main wall surface.

DETAILED DESCRIPTION OF THE PREFERRED EMBODIMENTS

The preferred embodiments of the present invention are described in detail below with reference to FIG. 1 to FIG. 4. The description is used for explaining the embodiments of the present invention only, but not for limiting the scope of the present invention.

Figure 1:
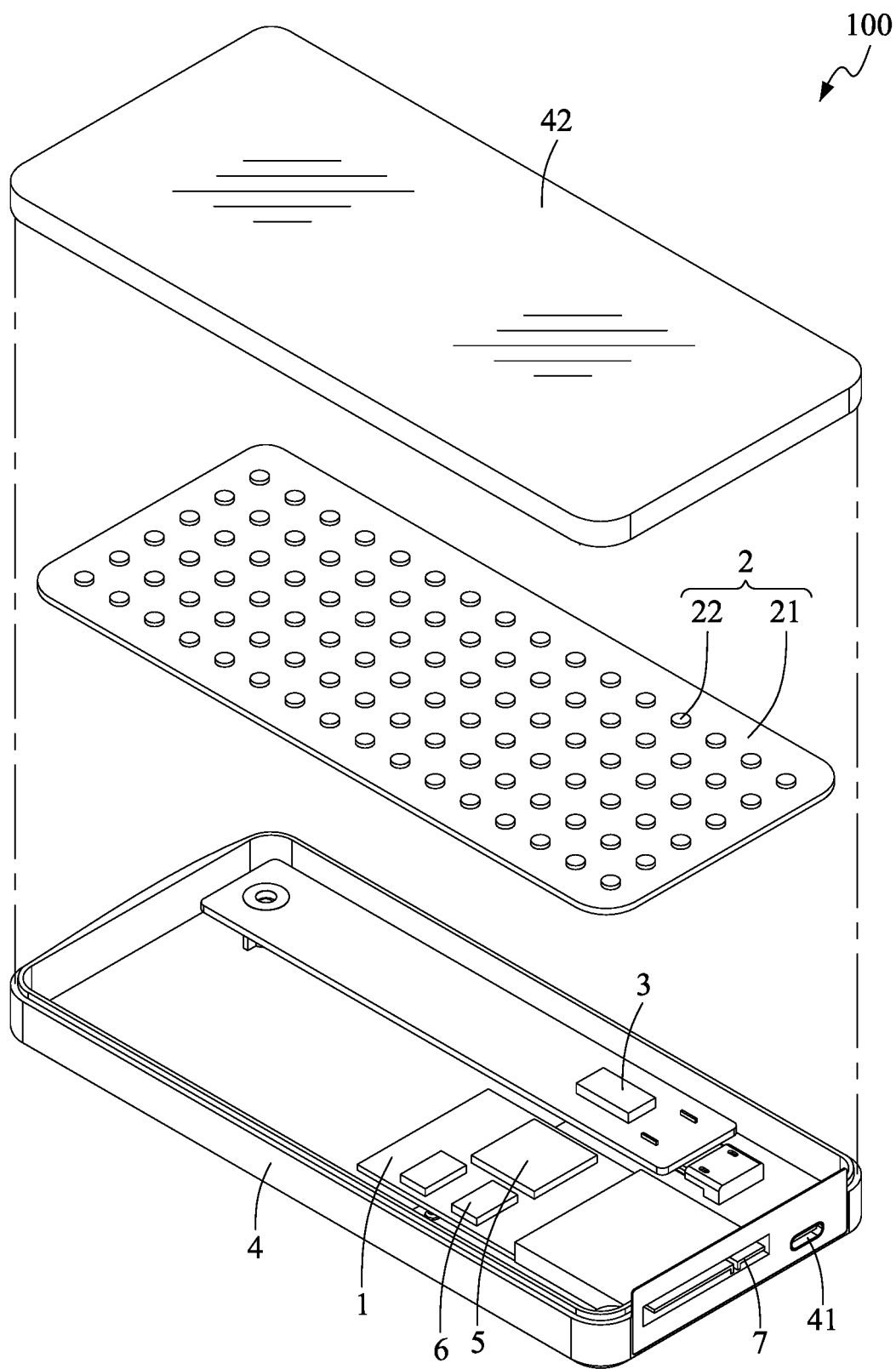
FIG. 1 is a schematic exploded view showing a luminous solid-state disk according to the first embodiment of the present invention.
Figure 2:
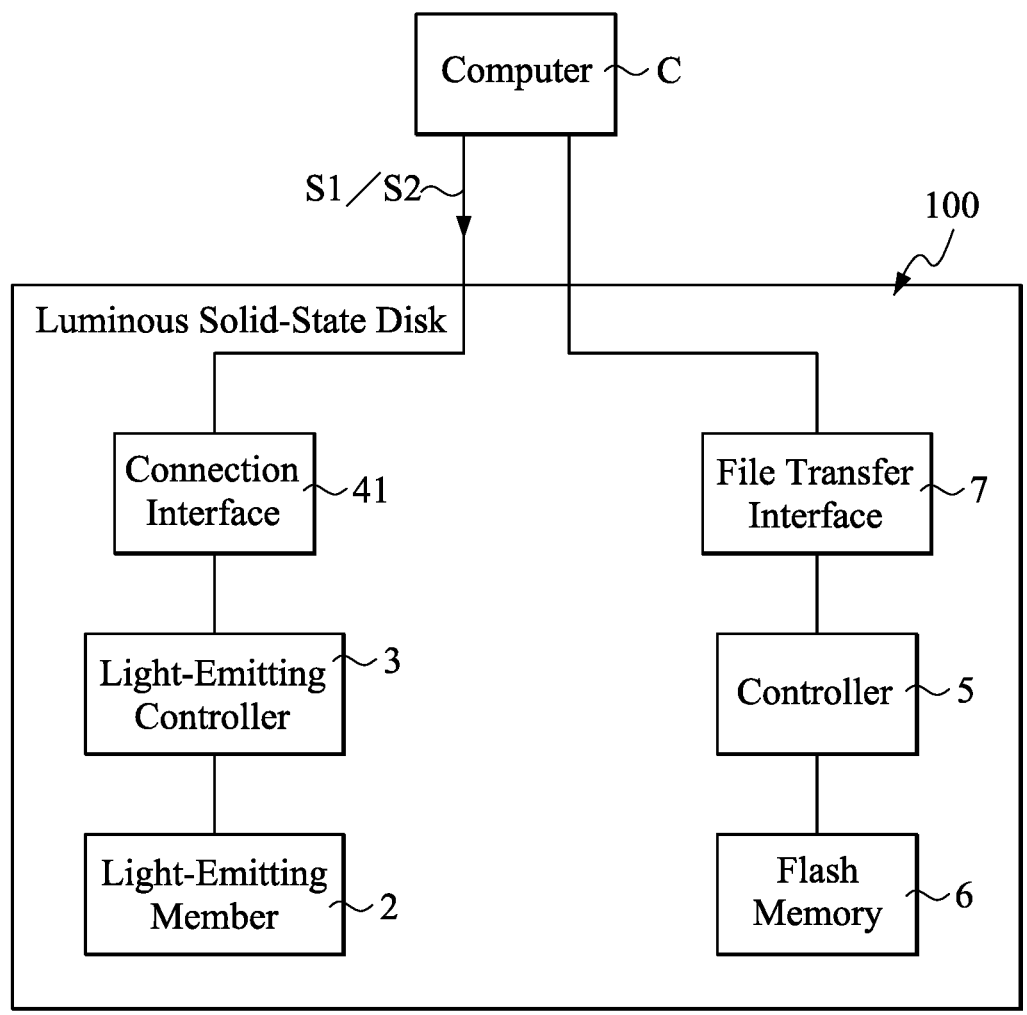
FIG. 2 is a block diagram showing a luminous solid-state disk according to the first embodiment of the present invention.
Figure 3:
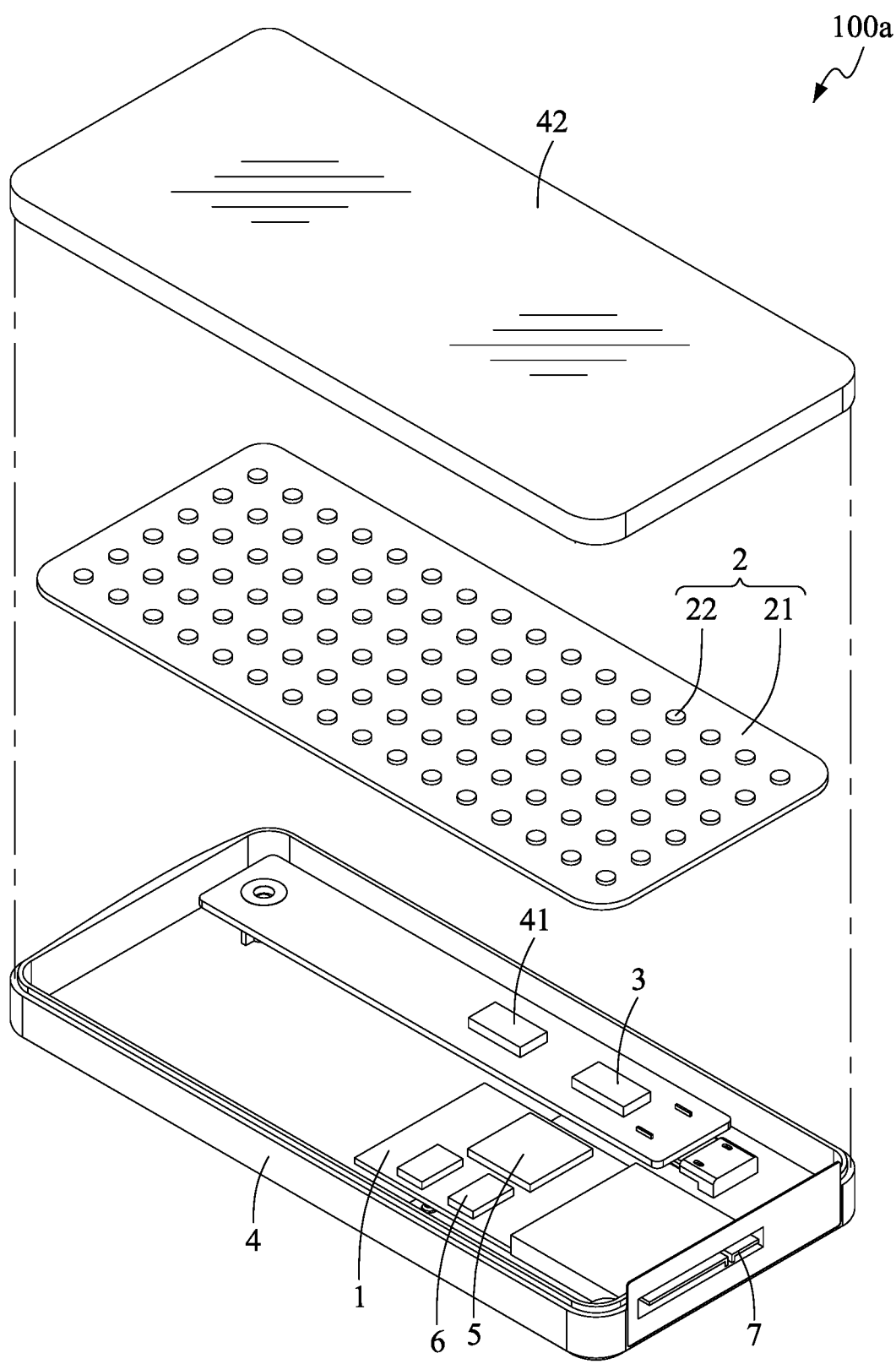
FIG. 3 is a schematic exploded view showing a luminous solid-state disk according to the second embodiment of the present invention.
Figure 4:
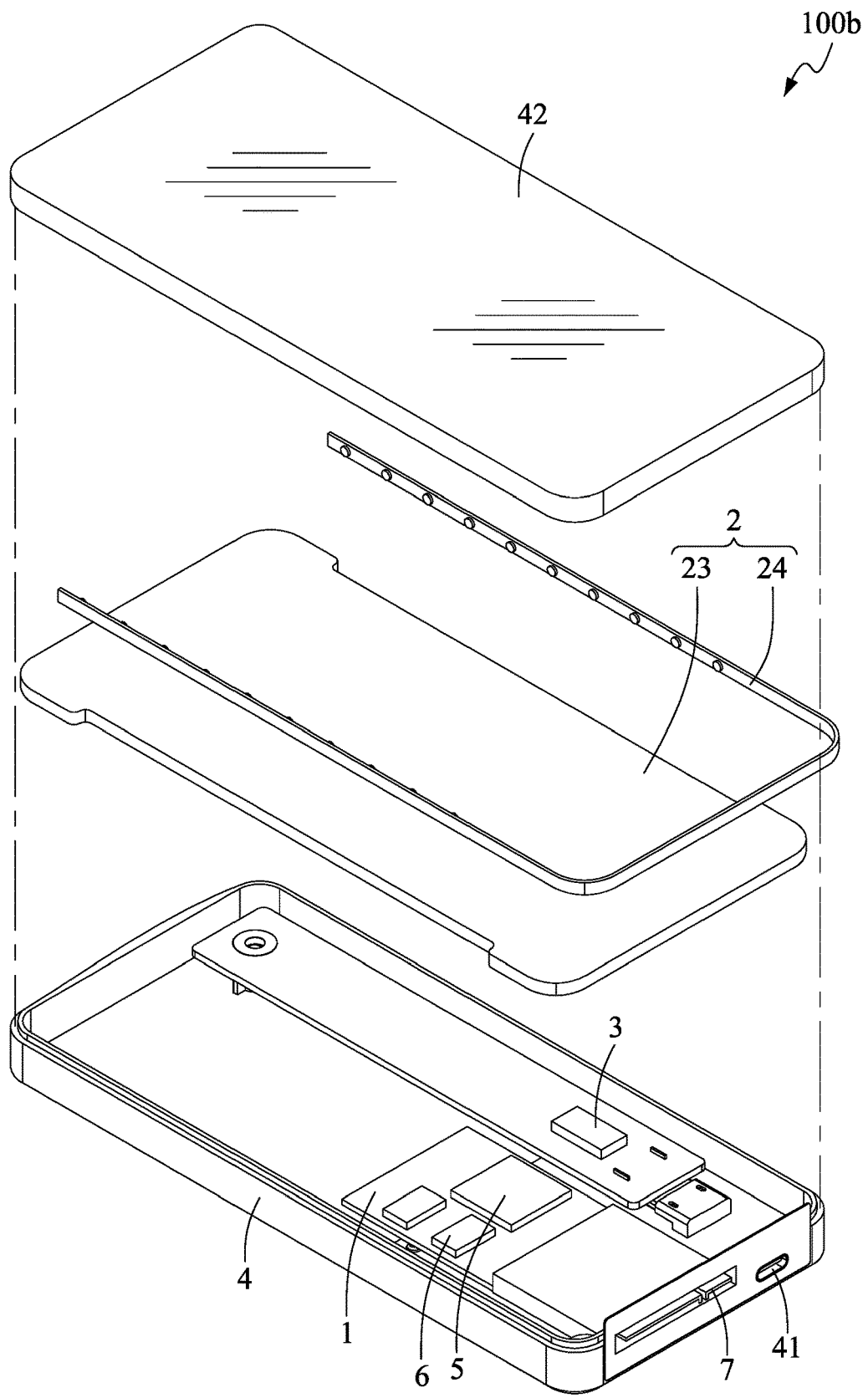
FIG. 4 is a schematic exploded view showing a luminous solid-state disk according to the third embodiment of the present invention.

As shown in FIG. 1 to FIG. 2, a luminous solid-state disk 100 according to the first embodiment of the present invention comprises: a solid-state disk 1; a light-emitting member 2; a light-emitting controller 3 in signal connection to the light-emitting member; a disk enclosure 4 accommodating the solid-state disk 1. The light-emitting member 2 and the light-emitting controller 3. The disk enclosure 4 has a connection interface 41. The light-emitting controller 3 is in signal connection to the connection interface 41 to receive, through the connection interface 41, a computer terminal information S1 from a computer C. The light-emitting controller 3 uses, according to the computer terminal information S1, a control signal to control the light-emitting member 2. The disk enclosure 4 has a main wall surface 42 which is transparent. Light from the light-emitting member 2 directly transmits through the main wall surface 42 or is reflected to transmit through the main wall surface 42. When light from the light-emitting member directly transmits through the main wall surface 42, the light-emitting member 2 includes a light board 21 and an LED array 22. The LED array 22 disposes on the light board 21, wherein light from the LED array 22 transmits towards the main wall surface 42 such that the LED array 22 displays, according to the control signal, a light pattern corresponding to the computer terminal information S1 or a light color corresponding to the computer terminal information S1. As shown in FIG. 4, when light from the light-emitting member 2 reflects to transmit through the main wall surface 42, the light-emitting member 2 includes a light guide plate 23 and an LED light bar 24. The LED light bar 24 disposed on a side edge of the light guide plate 23, and the LED light bar 24 transmits light towards the light guide plate 23, a luminous surface of the light guide plate 23 disposed towards the main wall surface 42 such that the LED light bar 24 displays, according to the control signal, a light color corresponding to the computer terminal information S1.

As shown in FIG. 1, according to the luminous solid-state disk 100 of the first embodiment of the present invention, the light-emitting member 2 is configured to emit light that directly penetrates through the main wall surface 42. In detail, the light-emitting member 2 includes a light board 21 and an LED array 22, and the LED array 22 has a plurality of multi-color LEDs. The multi-color LEDs are arranged at equal intervals along the two axes that are vertical to each other so that each multi-color LED becomes one pixel in the light pattern and can display a bitmap. The light pattern can be a text or a picture, and the light pattern can changes over time to be a scrolling ticker or a dynamic picture, and is customized by the user. Of course, each multi-color LED of the LED array 22 can also emit monochromatic light or gradient light corresponding to the computer terminal information S1. The color of the monochromatic light or the gradation light corresponds to a numerical value of the computer terminal information S1. The illumination area of the LED array 22 covers the entire main wall surface 42 to enable the main wall surface 42 to emit light over the entire surface. The main wall surface 42 is a smooth plane so that the user can clearly see each of the multi-color LEDs.

As shown in FIG. 2, the light-emitting controller 3 is independent of a controller 5 of the solid-state disk 1 in which the controller 5 is used as a flash memory controller, and the controller 5 controls the flash memory 6 of the solid-state disk 1. In other embodiments, the light-emitting controller 3 may also be integrated in the controller 5.

The connection interface 41 of the disk enclosure 4 is separate from the file transfer interface 7 used for transferring files. The connection interface 41 can be a wired connection port such as USB, thunderbolt, and is connected to a power signal line. In other embodiments, as shown in the luminous solid-state disk 100a of the second embodiment of FIG. 3, the connection interface 41 may also be a wirelessly connected wireless communication chip, or a luminous solid-state disk provided with two connection interfaces 41 which are the connection port for wired connection and the wireless communication chip. In this embodiment, the file transfer interface 7 is a SATA port.

The connection interface 41 is provided for connecting a power signal line. One end of the power signal line inserted into the connection interface 41 is a Micro USB, and one end connected to the motherboard is a USB to transmit the computer information S1. The light-emitting controller 3 detects whether the computer terminal information S1 is received. The computer terminal information S1 can be the system information of the computer such as the memory capacity usage state, the temperature state, the access speed state, the CPU usage rate, the fan speed, the temperature inside the chassis, and the like. The computer terminal information S1 can also be the health information of the solid-state disk 1 obtained by the computer C. Wherein the health information can be the complete S.M.A.R.T. information or the erase count information to inform the user of the time to backup or even upgrade/replace the solid-state disk 1. Of course, the light-emitting member 2 can also display system information of the computer and solid-state disk health information at the same time.

One end of the power signal line connected to the motherboard may also be a 3-pin (5V, D, G) or 4-pin (12V, R, G, B) port to transmit the light synchronization signal S2. The light-emitting controller 3 is signally connected to the connection interface 41 to receive a light synchronization signal S2 from the motherboard of the computer C through the power signal line. The light-emitting controller 3 detects whether the light synchronization signal S2 is received. When the light synchronization signal S2 is received, the light-emitting controller 3 controls the light-emitting member 2 with the control signal according to the light synchronization signal S2, so that the lighting effect on the main wall surface 42 of luminous solid-state disk 100 of the present invention can be synchronized with the lighting effect other components connected to the motherboard. When the computer terminal information S1 and the light-synchronization signal S2 are not received, the light-emitting controller 3 controls the light-emitting member 2 with a control signal according to the plurality of lighting effect built in the light-emitting controller 3 to generate a default lighting effect on the main wall surface 42. When receiving the computer terminal information S1 and the light synchronization signal S2 at the same time, the illumination controller 3 can be configured to control the illumination component 2 to simultaneously display the information corresponding to the computer terminal information S1 and the lighting effect corresponding to the light synchronization signal S2, or display one of the information corresponding to the computer terminal information S1 or the lighting effect corresponding to the light synchronization signal S2.

As shown in FIG. 4, the luminous solid-state disk 100a according to the second embodiment of the present invention has substantially the same structure as the luminous solid-state disk 100 of the first embodiment, with the difference that the connection interface 41 is a wirelessly connected wireless communication chip. In the present embodiment, the disk enclosure 4 does not need to be provided with an opening corresponding to the connection interface 41. The wireless communication chip can be a Wi-Fi chip, a Bluetooth chip, or the like. Thereby, it is possible to avoid adding a transmission line in a computer case having a complicated environment.

Lt As shown in FIG. 4, in the luminous solid-state disk 100b according to the third embodiment of the present invention, when the light from light-emitting member 2 reflects to transmit through the main wall surface 42, the light-emitting member 2 includes a light guide plate 23 and an LED light bar 24. The LED light bar 24 has a plurality of multi-color LEDs. The multi-color LEDs are arranged at equal intervals on the two long side edges of the main wall surface 42, and the light-emitting surface of the light guide plate 23 covers the entire main wall surface 42 so that the main wall surface 42 can emit light over the entire surface. Each of the multi-color LEDs of the LED light bar 24 can emit monochromatic light or gradient light corresponding to the computer terminal information S1. The color of the monochromatic light or the gradation light corresponds to a numerical value of the computer terminal information S1.

The above description should be considered as only the discussion of the preferred embodiments of the present invention. A person having ordinary skill in the art may make various modifications to the present invention. However, those modifications still fall within the spirit of the present invention and the scope defined by the appended claims.

What is claimed is:

1. A luminous solid-state disk, comprising:
a solid-state disk;
a light-emitting member;
a light-emitting controller in signal connection to the light-emitting member;
a disk enclosure accommodating the solid-state disk, the light-emitting member and the light-emitting controller, the disk enclosure having a connection interface, the light-emitting controller in signal connection to the connection interface to receive, through the connection interface, a computer terminal information from a computer, the light-emitting controller uses, according to the computer terminal information, a control signal to control the light-emitting member, the disk enclosure having a main wall surface, which is transparent,
wherein light from the light-emitting member directly transmits through the main wall surface or is reflected to transmit through the main wall surface,
when light from the light-emitting member directly transmits through the main wall surface, the light-emitting member includes a light board and an LED array that disposes on the light board, wherein light from the LED array transmits towards the main wall surface such that the LED array displays, according to the control signal, a light pattern corresponding to the computer terminal information or a light color corresponding to the computer terminal information,
when light from the light-emitting member reflects to transmit through the main wall surface, the light-emitting member includes a light guide plate and an LED light bar that disposed on a side edge of the light guide plate, light from the LED light bar transmits towards the light guide plate, a luminous surface of the light guide plate disposed towards the main wall surface such that the LED light bar displays, according to the control signal, a light color corresponding to the computer terminal information.

2. The illuminating solid-state disk of claim 1, wherein the connection interface is a wired connection port.

3. The illuminating solid-state disk of claim 1, wherein the connection interface is a wireless communication chip.

4. The illuminating solid-state disk of any one of claim 1, wherein the light-emitting controller receives, through the connection interface, a light synchronization signal from a motherboard of the computer such that the light-emitting controller controls the control signal to control the light-emitting member according to the light synchronization signal.

5. The illuminating solid-state disk of any one of claim 2, wherein the light-emitting controller receives, through the connection interface, a light synchronization signal from a motherboard of the computer such that the light-emitting controller controls the control signal to control the light-emitting member according to the light synchronization signal.

6. The illuminating solid-state disk of any one of claim 3, wherein the light-emitting controller receives, through the connection interface, a light synchronization signal from a motherboard of the computer such that the light-emitting controller controls the control signal to control the light-emitting member according to the light synchronization signal.

7. The illuminating solid-state disk of claim 4, wherein when the light-emitting controller does not receive the computer terminal information and the light synchronization signal, the light-emitting controller applies one of a plurality of lighting effects built in the light-emitting controller to use the control signal to control the light-emitting member.

8. The illuminating solid-state disk of claim 5, wherein when the light-emitting controller does not receive the computer terminal information and the light synchronization signal, the light-emitting controller applies one of a plurality of lighting effects built in the light-emitting controller to use the control signal to control the light-emitting member.

9. The illuminating solid-state disk of claim 6, wherein when the light-emitting controller does not receive the computer terminal information and the light synchronization signal, the light-emitting controller applies one of a plurality of lighting effects built in the light-emitting controller to use the control signal to control the light-emitting member.

10. The illuminating solid-state disk of any one of claim 1, wherein the computer terminal information is system information of the computer.

11. The illuminating solid-state disk of any one of claim 2, wherein the computer terminal information is system information of the computer.

12. The illuminating solid-state disk of any one of claim 3, wherein the computer terminal information is system information of the computer.

13. The illuminating solid-state disk of any one of claim 1, wherein the computer terminal information is health information of the solid-state disk extracted by the computer.

14. The illuminating solid-state disk of any one of claim 2, wherein the computer terminal information is health information of the solid-state disk extracted by the computer.

15. The illuminating solid-state disk of any one of claim 3, wherein the computer terminal information is health information of the solid-state disk extracted by the computer.

* * * * *